Aug. 8, 1950          R. S. FOX          2,518,229

PLUG GAUGE WITH ATTACHED PILOT

Filed Sept. 29, 1944

INVENTOR.
R. S. Fox
BY Joseph K. Schofield
ATTORNEY

Patented Aug. 8, 1950

2,518,229

UNITED STATES PATENT OFFICE 2,518,229

PLUG GAUGE WITH ATTACHED PILOT

Raymond S. Fox, West Hartford, Conn., assignor to Niles-Bement-Pond Company, West Hartford, Conn., a corporation of New Jersey Application September 29, 1944, Serial No. 556,341

2 Claims. (Cl. 33—178)

This invention relates to dimension gages and particularly to a gage of the cylindrical or plug type adapted to make use of a non-metallic or extremely hard metal gaging member such as tungsten carbide, boron carbide, glass, or other wear-resistant but frangible material.

Primary objects of the invention are to incorporate with a gage made of one of the above mentioned metallic or nonmetallic materials, a pilot member at one end to facilitate entrance of the gaging member into a hole being gaged, and another object is to provide means for mounting a suitable handle at the opposite end thereof.

With the above and other objects in view, the invention may include the features of construction set forth in the following specification and illustrated in the accompanying drawing.

In the accompanying drawing annexed hereto and forming a part of this specification, I have shown the invention embodied in cylindrical plug gages of medium size, but it will be understood that the invention can be otherwise embodied and that the drawing is not to be construed as defining or limiting the scope of the invention, the claims appended to this specification being relied upon for that purpose.

Figure 1:
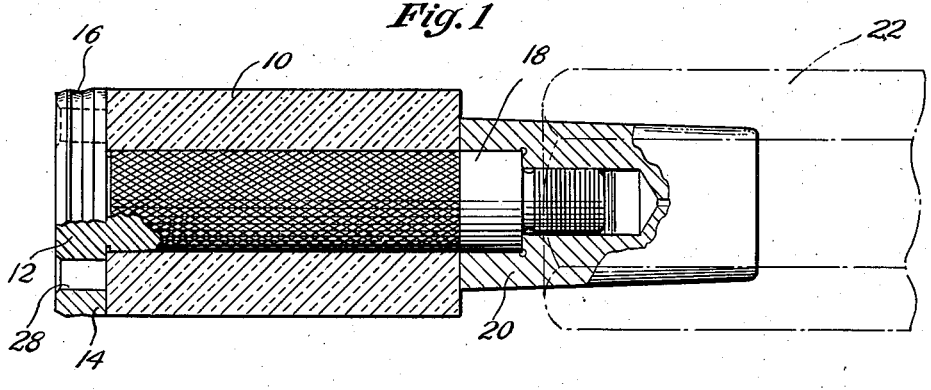
Figure 1 is a longitudinal view showing one form of gage illustrating the present invention partially sectioned to more clearly show its construction.

In the above-mentioned drawing there have been shown but two embodiments of the invention which are now deemed preferable, but it is to be understood that changes and modifications may be made within the scope of the appended claims without departing from the spirit of the invention.

Briefly and in its preferred aspect the invention may include the following principal parts: First, a gaging member of nonmetallic material such as boron carbide, glass, or other extremely hard but brittle material; second, a pilot member attached at one end and so formed that it will facilitate entrance of the gaging member into a hole being gaged; and third, means attached to the opposite end of the gaging member providing means for mounting a handle on the gage.

Referring more in detail to the figures of the drawing, I provide a cylindrical member 10 carefully surfaced upon its outer cylindrical surface to the precise dimension to be gaged. This gaging member may be made of any suitable material such as boron carbide, glass, "Stellite," tungsten carbide, or other extremely hard, wear-resisting but brittle material. The construction, however, has been particularly designed for the use of a nonmetallic material such as glass, porcelain, or other material which is extremely brittle and subject to chipping or breaking at its edges.

At one end of the gaging member 10 shown in Fig. 1 is mounted a pilot member 12 having an integral head portion 14 corresponding in outer diameter to the surface of the gaging member 10. This portion 14 of the pilot member is formed, as indicated at 16, to provide a front bevelled portion, a narrow land portion of substantially the same diameter as that of the gaging member, a V-shaped groove adjacent the land portion, and a cylindrical portion corresponding substantially to the diameter of the gaging member. A central projection or tang 18 is provided entering the central longitudinal opening extending through the gaging member 10.

At the opposite end of the gaging member 10 shown in Fig. 1 is attached an adapter 20 having a conical outer surface for the attachment of a suitable handle 22. One end of this adapter engages against an end face of said gaging member and its taper is such that a handle may be driven thereon. As shown in Fig. 1, this handle adapter 20 is counterbored and threaded so that the end of the projection 18 on the pilot member 12 may extend beyond the end face of the gaging member and partially within the handle adapter 20 so that it may be retained in place by its threaded end.

Figure 2:
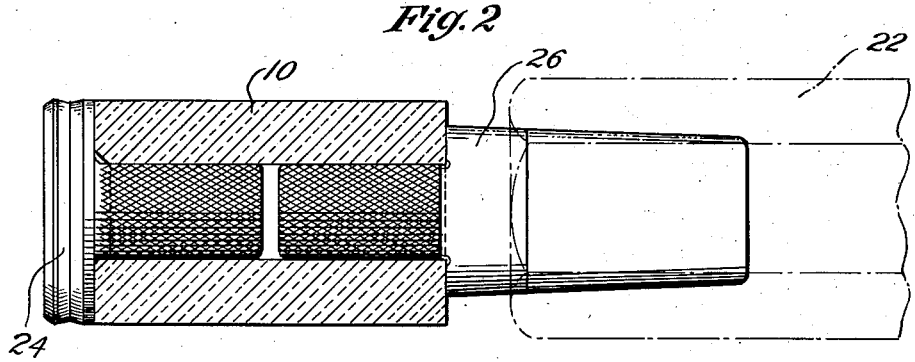
Fig. 2 is a view similar to Fig. 1 showing a modified form of the invention.

In Fig 2 the pilot member 24, which may have its head formed in the same manner as the pilot in Fig. 1, extends part way only through the central opening of the gaging member 10 and the handle adapter 26 also has an extension partially extending through the central opening within the gaging member 10. A handle 22 similar to that shown in Fig. 1 may be attached to the adapter 26.

To rigidly support the gaging member 10 upon the projection 18 formed on the pilot member 12, as indicated in Fig. 1, or to the pilot member 24 and the handle adapter 26, as shown in Fig. 2, the outer surfaces of these extensions may be suitably knurled and provided with a suitable cement or binding material which will prevent separation of the pilot and the handle adapter from the gaging member and prevent withdrawal of the gaging member from the pilot member as shown in Fig. 2.

Figure 3:
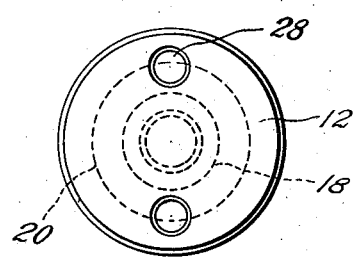
Fig. 3 is a front end view of the form of gage shown in Fig. 1.

The forward face of the pilot member 12 may have depressions 28 formed therein as shown in Fig. 3 by means of which a wrench may be applied to the pilot member 12 to attach the handle adapter 18 thereto.

What I claim is:

1. A dimension gage comprising in combination, a non-metallic hollow cylindrical gaging member, a metal pilot member having a projection inserted within one end of said gaging member, said pilot member having a coaxial integral head of substantially the same diameter as said gaging member, said head being annularly grooved to facilitate entrance of said gage into a hole being gaged, a handle adapter having a projection thereon extending centrally into the opposite end of said gaging member from the pilot member, and a handle member attached to the end of said adapter extending from said gage.

2. A dimension gage comprising in combination, a non-metallic hollow cylindrical gaging member, a metal pilot member inserted within one end of said gaging member and having an integral head of substantially the same diameter as said gaging member, said head being annularly grooved to facilitate entrance of said gage into a hole being gaged, a handle adapter having a projection formed thereon extending centrally into the opposite end of said gaging member from the pilot member, said handle adapter engaging against an end face of said gaging member, and a handle member attached to said adapter.

RAYMOND S. FOX.

REFERENCES CITED

The following references are of record in the file of this patent:

UNITED STATES PATENTS

| Number | Name | Date |
|---|---|---|
| 1,393,233 | Martell | Oct. 11, 1921 |
| 1,446,645 | Hanson | Feb. 27, 1923 |
| 1,487,834 | Blood | Mar. 25, 1924 |
| 2,199,052 | Lee | Apr. 30, 1940 |
| 2,213,767 | Markwick | Sept. 3, 1940 |
| 2,298,597 | Sexton | Oct. 13, 1942 |
| 2,360,058 | Hohwart | Oct. 10, 1944 |
| 2,423,094 | Gardner | July 1, 1947 |

FOREIGN PATENTS

| Number | Country | Date |
|---|---|---|
| 556,590 | Great Britain | Oct. 12, 1943 |

OTHER REFERENCES

Popular Science, May 1943, page 97.